Figures 1, 5:
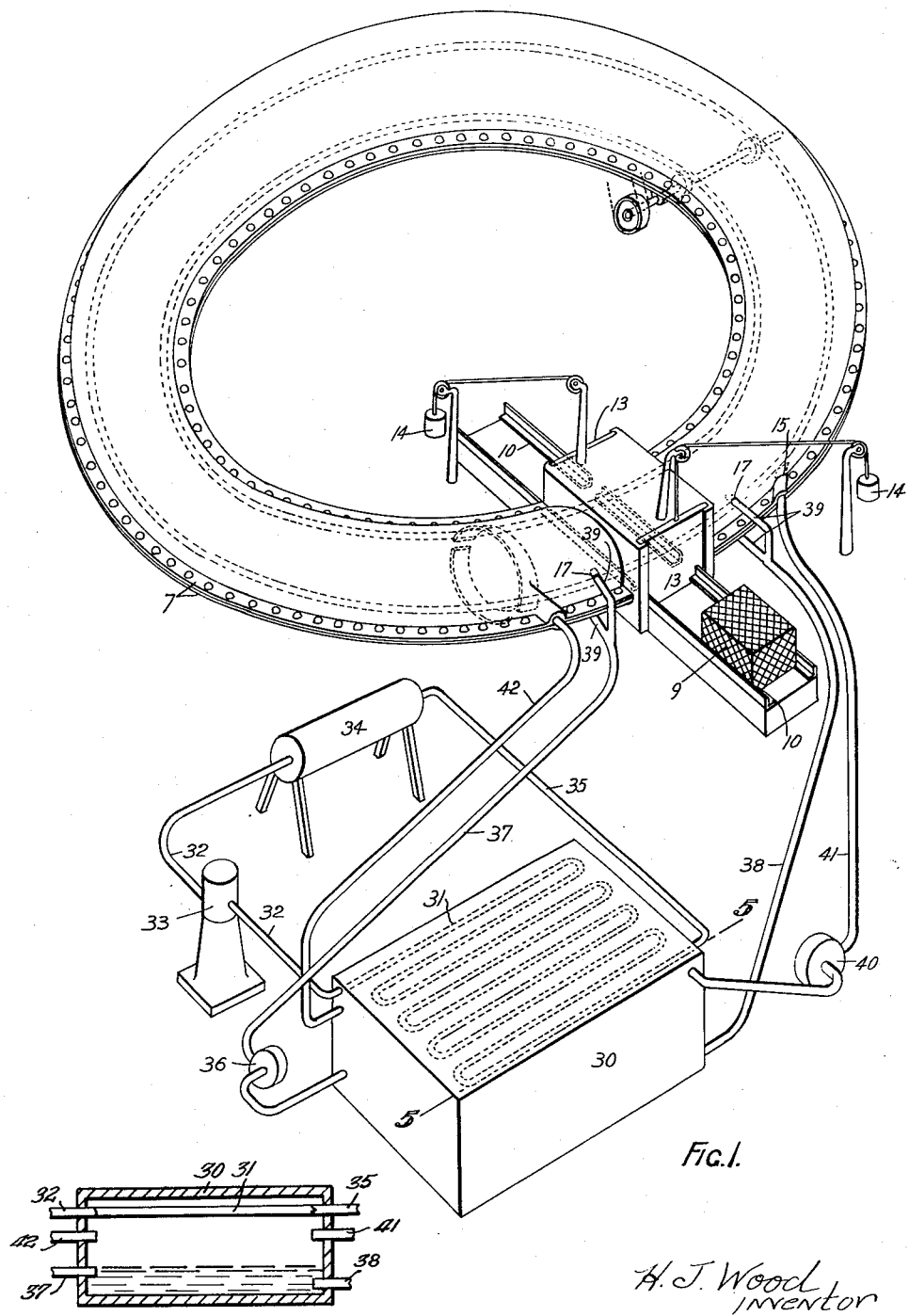

April 20, 1937.  H. J. WOOD  2,077,608
METHOD OF AND MACHINE FOR FREEZING CERTAIN COMESTIBLES
Filed Feb. 28, 1935   2 Sheets—Sheet 1

H. J. Wood
INVENTOR

By Glascock Downing & Seebold
ATTYS.

April 20, 1937.  H. J. WOOD  2,077,608

METHOD OF AND MACHINE FOR FREEZING CERTAIN COMESTIBLES

Filed Feb. 28, 1935  2 Sheets-Sheet 2

H. J. Wood
INVENTOR

By Glascock Downing & Seebold
ATTYS.

Patented Apr. 20, 1937

UNITED STATES PATENT OFFICE 2,077,608

METHOD OF AND MACHINE FOR FREEZING CERTAIN COMESTIBLES

Henry James Wood, Randwick, Sydney, New South Wales, Australia, assignor of one-third to Eric Gordon-Hume, Sydney, New South Wales, Australia Application February 28, 1935, Serial No. 8,721
In Australia August 4, 1934

7 Claims. (Cl. 62—104)

This invention relates to the preservative cooling or freezing of comestibles such as fish, meats, vegetables and fruit hereinafter referred to as material, and has been specially devised in order to provide, an improved method whereby the material is very expeditiously frozen so that the water elements of tissues thereof are converted into small ice granules or crystals which upon thawing of the frozen material will liquify and be reabsorbed into the protein colloidal system of the muscle tissue thereby causing the tissues to expand or swell to pre-cooled, pre-frozen or fresh condition, and to provide for application of the improved method an improved machine of simple, comparatively cheap, and durable construction which is convenient to install, economically and effectively operated and is expeditiously effective and thoroughly hygienic.

The improved method of freezing comestibles comprises the passage of charges of comestibles in suitable condition through an externally refrigerated cooling chamber or passage of relatively large cross sectional volume or capacity in contra direction to a flow, blast or accelerated current of air or other aeriform fluid reduced to a temperature not higher than zero Fahrenheit and hereinafter referred to as chilled aeriform fluid.

The comestibles should contain excess moisture to allow for evaporation during the freezing so that when they have been frozen they will contain their natural moisture, that is depletion thereof will not have occurred, consequently, if the material in natural condition does not contain sufficient excess moisture same is added by dipping the comestible in a suitable liquid or solution, such as a weak brine solution for fish and fish material and water or a suitable solution for other comestibles.

If desired, the comestible in natural condition or with added moisture may be wrapped in a thin protective covering such as of cellulose sheets or waxed or suitably prepared paper prior to being passed through the freezing chamber.

Also, if desired, the frozen charges of comestibles after emergence from the freezing chamber, whether uncovered, or covered, or after removal of any covering, may be dipped in fresh water preferably at a temperature of about 60 to 70 degrees Fahrenheit to cause a glaze about the comestible or the covering thereon to prevent oxidation or "rusting".

The charge may then be stored, in desired low temperature until required for use, when it is removed and thawed in any convenient and uninjurious manner.

The cross sectional capacity of the externally refrigerated cooling chamber or passage is somewhat large in relation to the charges that are to be passed therethrough, in order that a sufficient volume at a velocity not inordinately high may be passed therethrough to effect the freezing of the charges during their passage.

The improved machine for application of the improved method for freezing comestibles, comprises a cooling chamber or passage, such as a tube of any desired cross sectional shape, dimensions and length, with a cooling jacket or passage exteriorly thereabout, preferably in cross sectional halves and in longitudinal sections adapted to be secured together transversely and longitudinally, and having a closable access, loading and unloading opening through the jacket and to the container, the jacket permitting circulation of cooling medium in one direction through one half and in the opposite direction through the other half, and inside the cooling chamber, an endless conveyor on a suitable support accessible through the beforementioned opening and which is preferably provided with or adapted to receive and detachably hold a longitudinally spaced plurality of interstitial carriers for reception of charges of material to be treated. If desired, the chamber and jacket walls may be constructed and arranged so that when cross sectional halves thereof are bolted together, one jacket will be about the chamber.

The machine is used with a cooling medium tank which may be divided if and as required and contains or is embraced by cooling pipes or coils requisitely and circulatively connected to usual circulating compressor, and serves also as a cooling chamber for fluid, and is in requisite and circulative connection through a pump with the cooling jacket about the chamber, and is also in requisite and circulative communication through a fan or pump with the cooling chamber so that fluid from and to the chamber is drawn through said tank, about the pipes when they are in the tank, and across the cooled cooling medium, such as brine, to be cooled and acquire density of humidity which increases the freezing effect, and prevents or retards the evaporative effects, of the operation.

Figure 2:
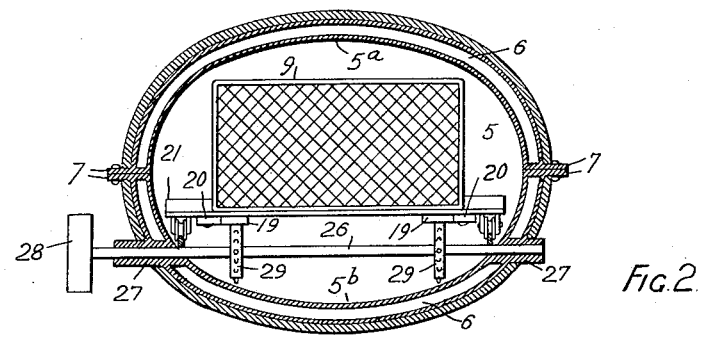
Figure 3:
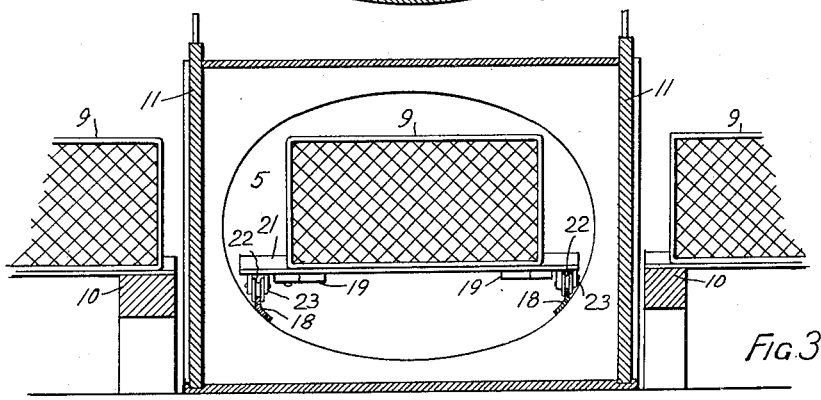
Figure 4:
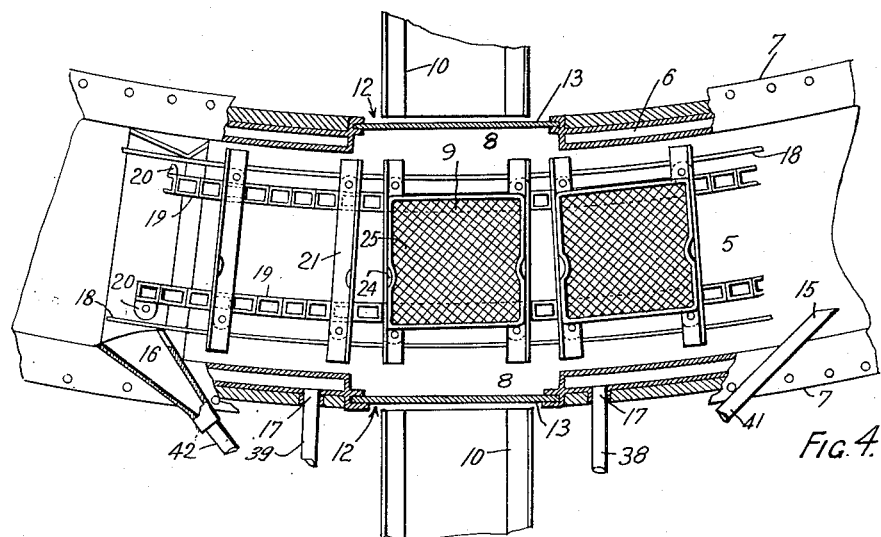

And in order that the invention and a practical application thereof may be readily understood the same will now be described with reference to the accompanying drawings in which;

Figure 1 is a diagrammatic perspective view of a suitable construction of the machine, Figure 2 is a cross sectional elevation of the chamber or passage showing driving means, Figure 3 is a cross sectional elevation of a loading and unloading opening to the chamber or passage and a convenient open ended housing thereabouts and closures for the latter, and Figure 4 is a fragmentary sectional plan of the chamber or passage showing a traversable conveyor and removable containers thereon.

Fig. 5 is a vertical sectional view through the refrigerating tank in the plane of line 5—5 of Fig. 1.

The chamber or passage 5, which is shown of circular configuration and slightly oval in section for convenience, is preferably formed in two cross sectional halves 5a and 5b (see Fig. 2) with an externally insulated jacket 6 thereabout, and each half with lateral flange 7 at each side for bolting them together upon requisite jointing, so that there will be two separate half jackets about the chamber 5.

The chamber 5 has an access, loading and unloading opening 8 thereacross so that a material cage or carrier 9 may be slid in one side to displace one pushed out through the other side, a platform 10 at each side supporting the carriers, and suitable closures for the opening, such as a housing 11 with open ends 12 provided with convenient closures such as refrigerator doors, or sliding doors 13, arranged with counterweight devices 14 if desired.

To the chamber is an air or fluid inlet 15 at one side of the opening 8 connected to source of supply or circulation, and at the opposite side is an air or fluid outlet 16 which may be of annular or funnel-like formation so that fluid will be drawn thereinto and not pass along to the opening 8, and said outlet 16 is connected to a source of withdrawal or circulation, as hereinafter described.

The half jackets 6 about the chamber 5 and which terminate at the opening 8 have ports 17 thereinto at opposite ends for connection to cooling medium cooling and circulating means.

Inside the chamber 5 at each side is a rail 18, which is formed with or secured to the wall in any convenient manner, to support an endless traversable conveyor of any suitably convenient construction such as a belt of hinged links 19 which are provided with orificed lugs 20 to which are secured upon requisite face cross members 21, which may be of angle iron, and the belt is supported upon the rails 18 by sheaves 22 on axles 23 in lugs or brackets formed with or secured to the cross members 21 which are provided with a holding device such as a bowed or convexed spring 24 to releasably engage in a recess 25 in the side of a carrier 9 when the latter is slid between a pair of the cross members 21 which are complementarily spaced.

The links are preferably made to a planar shape to conform to the contour of the path around which the conveyor is to be traversed.

Means for actuating the conveyor may be a shaft 26 in suitable packed bearings 27 and carrying a pulley 28 by which it may be driven and sprocket wheels 29 for engaging the links 19 of the conveyor.

In a convenient arrangement as in Figure 1, combined cooling medium and air or fluid cooling and circulating means comprise, a cooling tank 30 in which are the expansion pipes 31 of a cooling system, such as pipe 32, compressor 33, condenser 34 and pipe 35. The tank 30 through which the cooling medium circulates, is connected through pump 36 by pipe 37 and through pipe 38 both with branched ends 39 to the half jackets 6, though, if desired, the branch from each pipe may be connected to the opposite jacket so that circulation of cooling medium will be in contra direction in the respective jackets. The tank 30 is also connected through fan or pump 40 and pipes 41 and 42 to the chamber 5.

In operation, the cooling medium is circulated through the cooling tank 30 and the jackets 6 about the chamber 5, chilled fluid is drawn through the tank 30 and the chamber 5 in one direction, and the material to be treated (which may be previously dipped in suitable solution if desired, and, if desired, enclosed in a suitable protective covering) is loaded through the opening 8 onto the conveyor 19 preferably in carriers 9, and the conveyor 19 is actuated at regulated speed in the opposite direction to the circulation of the chilled fluid.

I claim:—

1. Improved method of freezing material comprising the enclosing of same in a protective covering, passing it in contradirection through a flow of chilled fluid, removing the protective covering and then dipping the material in fresh water.

2. Improved method of freezing material comprising the dipping of same in liquid, enclosing same in a protective covering, passing it in contradirection through a flow of chilled fluid, removing the protective covering and then dipping the material in fresh water.

3. Improved method of freezing material comprising the passing of same in contradirection through a flow of chilled aeriform fluid in a chamber of relatively large cross sectional volume and having thereabout a chilling jacket in which refrigerant is circulated.

4. Improved method of freezing material comprising the dipping thereof in liquid and then passing it in contradirection through a flow of chilled aeriform fluid in a chamber of relatively large cross sectional volume and having thereabout a chilling jacket in which refrigerant is circulated.

5. Improved machine for freezing material, comprising a cooling chamber of relatively large cross sectional volume, adapted to be connected to a source of chilled aeriform fluid for circulation therethrough, and having thereabout a jacket in communication with means for circulating a refrigerating medium in said jacket, an endless conveyor through said chamber, means for actuating the conveyor, and a closable access opening to said chamber.

6. Improved machine for freezing material, comprising a cooling chamber of relatively large cross sectional volume, adapted for circulation of chilled aeriform fluid therethrough and for insertion and withdrawal of material, thereabout a jacket or jackets adapted for circulation therethrough of cooling medium, inside the chamber a movable conveyor, and exteriorly operable means in said chamber for actuating said conveyor.

7. Improved machine for freezing material, comprising the combination and arrangement with the parts set forth in claim 5 of means for supplying and maintaining a forceful circulation of chilled aeriform fluid through the cooling chamber, and means for supplying and maintaining a circulation of cooling medium through the jacket about said cooling chamber.

HENRY JAMES WOOD.